United States Patent
Lin

(10) Patent No.: US 10,605,597 B1
(45) Date of Patent: Mar. 31, 2020

(54) ELECTRONIC DEVICE AND METHOD FOR MEASURING DISTANCE USING IMAGE THEREOF

(71) Applicant: Wistron Corp., New Taipei (TW)

(72) Inventor: Chia-Ching Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/367,190

(22) Filed: Mar. 27, 2019

(30) Foreign Application Priority Data

Dec. 24, 2018 (TW) .............................. 107146727 A

(51) Int. Cl.
*G01C 3/32* (2006.01)
*G01C 3/08* (2006.01)
*G06T 7/70* (2017.01)

(52) U.S. Cl.
CPC ................. *G01C 3/32* (2013.01); *G01C 3/08* (2013.01); *G06T 7/70* (2017.01)

(58) Field of Classification Search
None
See application file for complete search history.

(56) References Cited

U.S. PATENT DOCUMENTS

| | | | | |
|---|---|---|---|---|
| 6,559,931 B2 * | 5/2003 | Kawamura | ............ | G01C 11/06 348/135 |
| 8,903,568 B1 * | 12/2014 | Wang | .................. | G05D 1/0016 701/2 |
| 9,766,622 B1 * | 9/2017 | Yang | ...................... | B64C 39/024 |
| 9,984,586 B2 * | 5/2018 | Popa-Simil | .............. | G09B 9/48 |
| 10,370,118 B1 * | 8/2019 | Nielsen | .................. | B64D 47/06 |
| 10,377,487 B2 * | 8/2019 | Takahashi | ............. | B64C 39/024 |
| 2008/0192110 A1 | 8/2008 | Grover | | |
| 2009/0015679 A1 * | 1/2009 | Hayakawa | .............. | G06T 13/20 348/207.1 |
| 2010/0046801 A1 * | 2/2010 | Ishiyama | ................. | G01C 3/08 382/106 |
| 2011/0288696 A1 * | 11/2011 | Lefebure | ................ | A63H 27/12 701/2 |
| 2011/0311099 A1 * | 12/2011 | Derbanne | ............... | G06T 7/207 382/103 |
| 2012/0050524 A1 * | 3/2012 | Rinner | ...................... | G06T 3/40 348/117 |

(Continued)

*Primary Examiner* — Jefferey F Harold
*Assistant Examiner* — Mustafizur Rahman

(57) ABSTRACT

An electronic device is provided. The electronic device includes: an inertial measurement unit, a camera device, and a processor. The inertial-measurement unit is configured to detect a pitch angle of the electronic device. The camera device is configured to focus on a target object to capture an object image. The processor is configured to execute an image-distance-measuring program to perform the following steps: obtaining a lens-focal-length parameter corresponding to the object image from an operating system performed by the electronic device; calculating a plurality of terminal parameters corresponding to the pitch angle according to the lens-focal-length parameter and the pitch angle; converting the terminal parameters to a plurality of linear parameters; and calculating an object distance between the target object and the camera device according to a linear equation of the linear parameters, and the upper focusing distance, and the lower focusing distance.

12 Claims, 8 Drawing Sheets

(56) References Cited

U.S. PATENT DOCUMENTS

| | | | |
|---|---|---|---|
| 2012/0105634 A1* | 5/2012 | Meidan | G08B 13/1965 |
| | | | 348/143 |
| 2012/0327197 A1* | 12/2012 | Yamashita | G03B 35/08 |
| | | | 348/50 |
| 2014/0008496 A1* | 1/2014 | Ye | B64C 13/20 |
| | | | 244/190 |
| 2014/0176725 A1* | 6/2014 | Stuart | G01J 5/025 |
| | | | 348/164 |
| 2014/0293137 A1* | 10/2014 | Braunstein | H04N 5/4403 |
| | | | 348/734 |
| 2014/0300704 A1 | 10/2014 | Ramaswamy et al. | |
| 2014/0328574 A1* | 11/2014 | Sandberg | G11B 27/034 |
| | | | 386/280 |
| 2016/0144977 A1* | 5/2016 | Way | H04N 5/23238 |
| | | | 348/38 |
| 2016/0191793 A1* | 6/2016 | Yang | H04N 5/23222 |
| | | | 348/207.11 |
| 2017/0068424 A1* | 3/2017 | Hong | G06F 3/04842 |
| 2017/0195549 A1 | 7/2017 | Cao et al. | |
| 2017/0251180 A1* | 8/2017 | Smolyanskiy | G06Q 10/101 |
| 2019/0066334 A1* | 2/2019 | Gu | G06T 7/80 |
| 2019/0161121 A1* | 5/2019 | Greenwood | B62D 15/0285 |

* cited by examiner

ELECTRONIC DEVICE AND METHOD FOR MEASURING DISTANCE USING IMAGE THEREOF

CROSS REFERENCE TO RELATED APPLICATIONS

This Application claims priority of Taiwan Patent Application No. 107146727, filed on Dec. 24, 2018, the entirety of which is incorporated by reference herein.

BACKGROUND OF THE DISCLOSURE

Field of the Disclosure

The disclosure relates to image processing, and, in particular, to an electronic device and a method for measuring distance using an image.

Description of the Related Art

With the advent of technology, portable electronic devices are usually equipped with camera devices for taking pictures. Although the conventional electronic device can utilize the augmented reality to pre-establish the distance information of the environment, the distance of the target object is calculated. However, computing with augmented reality will consume considerable system resources and power consumption. In addition, when the plane detected by the augmented reality is incorrect or inaccurate, the error of the measured distance information will also become larger. The conventional electronic device can also be equipped with an additional laser ranging device to detect the distance of the target object, but at an additional cost and with less convenience.

Accordingly, how to quickly and efficiently obtain the object distance between the target object and the camera has become an important issue.

BRIEF SUMMARY OF THE DISCLOSURE

A detailed description is given in the following embodiments with reference to the accompanying drawings.

In an exemplary embodiment, an electronic device is provided. The electronic device includes: an inertial measurement unit, a camera device, and a processor. The inertial-measurement unit is configured to detect a pitch angle of the electronic device. The camera device is configured to focus on a target object to capture an object image. The processor is configured to execute an image-distance-measuring program to perform the following steps: obtaining a lens-focal-length parameter corresponding to the object image from the operating system performed by the processor; calculating a plurality of terminal parameters corresponding to the pitch angle according to the lens-focal-length parameter and the pitch angle; converting the terminal parameters to a plurality of linear parameters; and calculating an object distance between the target object and the camera device according to a linear equation of the linear parameters, and the upper focusing distance, and the lower focusing distance.

In another exemplary embodiment, a method for measuring a distance using an image for use in an electronic device is provided. The electronic device includes an inertial-measurement unit and a camera device. The method includes the steps of: obtaining a lens-focal-length parameter corresponding to the object image from the operating system; calculating a plurality of terminal parameters corresponding to the pitch angle according to the lens-focal-length parameter and the pitch angle of the electronic device; converting the terminal parameters corresponding to the pitch angle to a plurality of linear parameters corresponding to the pitch angle; and calculating an object distance between the target object and the camera device according to a linear equation of the linear parameters, the upper focusing distance, and the lower focusing distance.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

Figure 1:
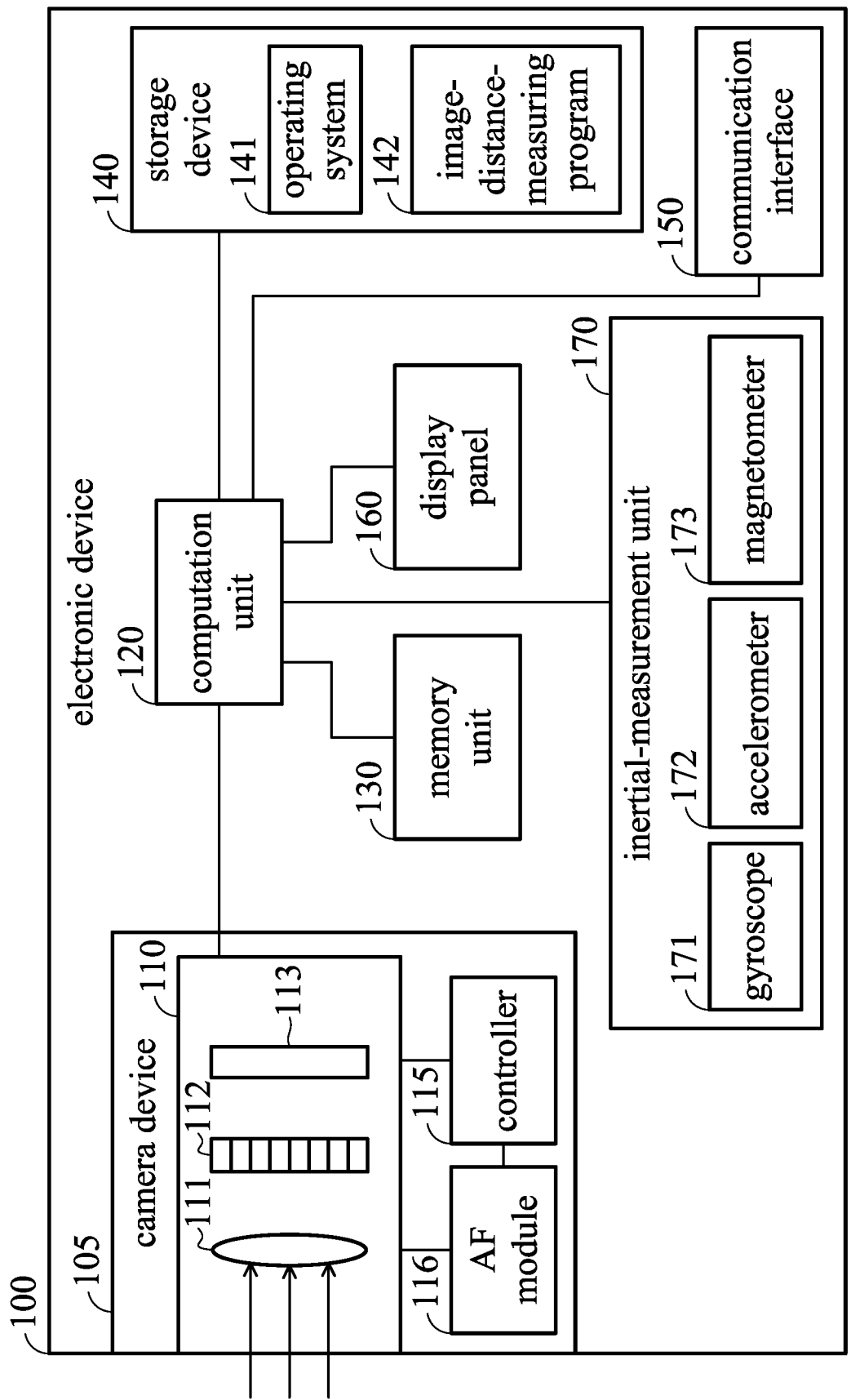
FIG. 1 is a block diagram of an electronic device in accordance with an embodiment of the disclosure.

The following description is made for the purpose of illustrating the general principles of the disclosure and should not be taken in a limiting sense. The scope of the disclosure is best determined by reference to the appended claims.

It is to be understood that the following disclosure provides one or more embodiments or examples to implement various features of the embodiments of the disclosure. The elements and arrangements of the specific examples disclose below are intended to simplify the embodiments of the disclosure and are not intended to be limited to the examples. In addition, the features in the drawings are not drawn to scale and are for illustrative purposes only.

FIG. 1 is a block diagram of an electronic device in accordance with an embodiment of the disclosure. The electronic device 100 may be a portable electronic device such as a smartphone, a tablet PC, a laptop, etc., but the disclosure is not limited thereto.

As depicted in FIG. 1, the electronic device 100 includes a camera device 105, a computation unit 120, a memory unit 130, a storage device 140, a communication interface 150, a display panel 160, and an inertial-measurement unit (IMU) 170. For example, the camera device 105 includes at least one camera module 110, a controller 115, and an auto-focus module 116. The camera module 110 is configured to capture an object image.

The camera module 110 includes a lens 111, a color filter array (CFA) 112, and an image sensor 113. The color filter array 112 may include a plurality of red filters, green filters, and blue filters. The red, green, and blue filters may be arranged in a predetermined pattern such as a Bayer pattern or other types of patterns. The image sensor 113 may be a color image sensor that is implemented by a charge-coupled-device (CCD) sensor, or a complementary metal-oxide semiconductor (CMOS) sensor. The controller 115, for example, may be a microcontroller, but the disclosure is not limited thereto.

The incident light from the scene of the target object may pass through the lens 111 and the color filter array 112 to form an image on the image sensor 113, so that the photoelectric element of each pixel in the image sensor 113 may convert the sensed light into an electric signal that is transmitted to the controller 115. The controller 115 may transmit each pixel in the captured image to the computation unit 120. The auto-focus module 116, for example, may include a step motor that is configured to adjust the focal length of the lens 111 or the whole camera module 110 according to a control signal from the controller 115.

The controller 115, for example, may execute a passive auto-focus algorithm (e.g., a contrast-detection or phase-detection auto-focus algorithm) on the image captured by the image sensor 113 or receive a focus touch-control signal from the display panel 160 to control the auto-focus module 116 to fine-tune the position of the lens 111 or the whole camera module 110, so that the image sensor 113 can precisely focus on the target object to capture the object image. In addition, the controller 115 may transmit the focus information of the camera module 110 to the computation unit 120, wherein the focus information, for example, may be information about the focal length, steps of the step motor, etc., but the disclosure is not limited thereto.

In some embodiments, the electronic device 100 may include two or more camera modules 110, wherein the lenses 111 in different camera modules 110 may have different focal-length ranges, and the controller 115 may perform auto-focusing using the images captured by different camera modules 110 to control the auto-focus module 116 to fine-tune the lens 111 or the selected camera module 110 which has the corresponding focal-length range, so that the image sensor 113 in the selected module 110 may correctly focus on the target object. The controller 115 may also transmit the focus information about the camera module 110 selected by the auto-focusing function to the computation unit 120, wherein the focus information, for example, may be information about the focal length, the steps of the step motor, etc., but the disclosure is not limited thereto.

The computation unit 120 is electrically connected to the camera device 105. The computation unit 120 can be implemented in various ways, such as being implemented by a dedicated hardware circuit or general-purpose hardware (e.g., a single processor, multiple processors capable of performing parallel processing, or other processors having computation capability). For example, the aforementioned processor may be a central processing unit, a general-purpose processor, or a microcontroller, but the disclosure is not limited thereto.

The storage device 140, for example, may be a non-volatile memory such as a hard-disk drive, a solid-state disk, or a read-only memory, but the disclosure is not limited thereto. The storage device 140 is configured to store an operating system (OS) 141 (e.g., iOS or ANDROID operating systems) of the electronic device 100 and an image-distance-measuring program 142, wherein the image-distance-measuring program 142 may estimate dimension information of the target object in the object image captured by the camera device 105 according to the field of view (FOV) of the camera device 105 and an lens-focal-length parameter reported by the operating system 141, wherein the dimension information, for example, may be the width and height of the target object.

The memory unit 130, for example, may be a volatile memory such as a static random access memory (SRAM) or a dynamic random access memory (DRAM), but the disclosure is not limited thereto. The memory unit 130 may be used as an execution space of the operating system 141, and a storage space of the temporarily stored intermediate data generated by the image-distance-measuring program 142, and an image buffer. For example, the computation unit 120 may load the operating system 141 and the image-distance-measuring program 142 stored in the storage device 140 to the memory unit 130 for execution. The communication interface 150, for example, may include wired and/or wireless transmission interfaces that are configured to connect the electronic device 100 to other electronic devices or servers.

The display panel 160, for example, may be a liquid-crystal display panel, a light-emitting diode (LED) display panel, an organic light-emitting diode (OLED) display panel, e-Ink, etc., but the disclosure is not limited thereto. In some embodiments, a touch-control device (not shown) can be integrated into the display panel 160 for performing touch operations. The touch device may be a capacitive or resistive touch-control device, and the display panel 160 can be regarded as a "touch panel", but the disclosure is not limited thereto.

The inertial-measurement unit 170 may include a gyroscope 171, an accelerometer 172, and a magnetometer 173. The gyroscope 171 is configured to measure the orientation and angular speed of the electronic device 100. The accelerometer 172 is configured to measure the acceleration of the electronic device 100, and the magnetometer 173 is configured to measure the magnetic strength and direction at the position where the electronic device 100 is located. The data measured by the gyroscope 171, accelerometer 172, and magnetometer 173 can be collectively regarded as inertial information. For example, the accelerometer 172 and magnetometer 173 of the inertial-measurement unit 170 may detect the pitch of the electronic device 100.

In an embodiment, if the electronic device 100 is a model of the iPhone 4S or above and the operating system 141 is a version of iOS 8 or above, the lens-focal-length parameter reported by the operating system 141, for example, may be "lensPosition". The lens-focal-length parameter lensPosition may be a value between 0 and 1, where the value 0 may indicate the closet distance that the lens 111 can focus on, and the value 1 may indicate the farthest distance that the lens 111 can focus on, but the farthest distance does not represent infinity. It should be noted that the lens-focal-length parameter lensPosition does not directly indicate the focal length value of the lens 111, but a value that has been converted by the operating system 141 and is not equal to the value of a constant divided by the focal length. In addition, the value of the lens-focal-length parameter lensPosition reported by the operating system 141 also changes according to the pitch angle of the electronic device 100.

In another embodiment, the operating system 141 used by the electronic device, for example, may be ANDROID operating system. After autofocusing, the lens-focal-length parameter reported by the operating system 141 may be LENS_INFO_FOCUS_DISTANCE_CALIBRATION, wherein the reported focal-length parameter is also a value between 0 and 1, and is a value corrected by an application interface (API) of the operating system 141. The value 0 indicates the closest distance that the lens 111 can focus on, and the value 1 indicates the farthest distance that the lens 111 can focus on, but the farthest distance does not represent infinity. For example, in response to the distance between the target object and the lens 111 is within a specific focal-length range (e.g., approximately 10~25 cm) and the pitch of the electronic device 100 being at a specific angle (e.g., 0 or 90 degree), the focal length fused by the lens 111 can be calculated using equation (1):

$$f = \frac{1}{\text{LENS\_INFO\_FOCUS\_DISTANCE\_CALIBRATION}} \quad (1)$$

However, outside the above focal-length range, the focal-length calculated by equation (1) may have an error, and the farther the distance of the target object is, the larger the error is. In addition, if the pitch angle of the electronic device 100 is not at the aforementioned specific angle, the focal length calculated by equation (1) also has an error. Moreover, the value of the lens-focal-length parameter LENS_INFO_FOCUS_DISTANCE_CALIBRATION reported by the operating system 141 also changes according to the pitch of the electronic device 100.

For purposes of description, in the following embodiments, the operating system 141 may be iOS 8 or above, and the lens-focal-length parameter is "lensPosition".

Figure 2A:
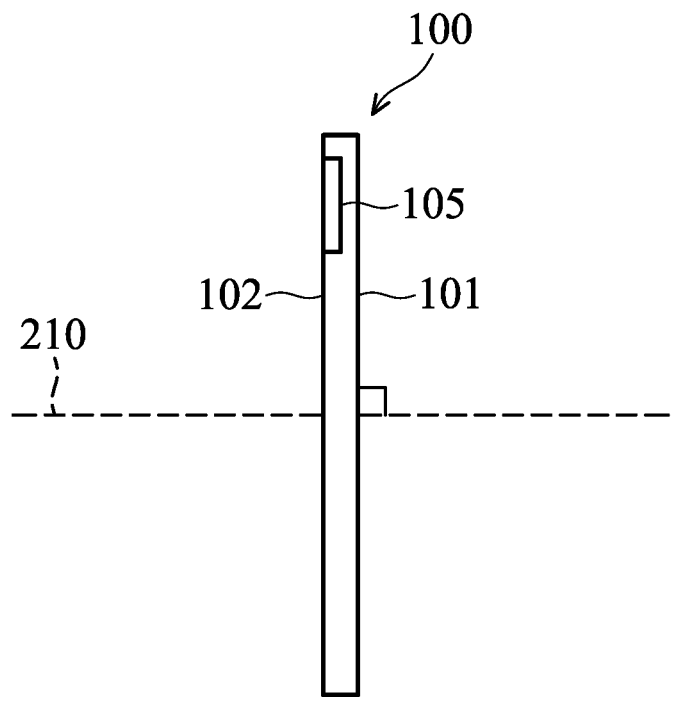
FIGS. 2A-2B are diagrams of the electronic device at different pitch angles in accordance with an embodiment of the disclosure.
Figure 2B:
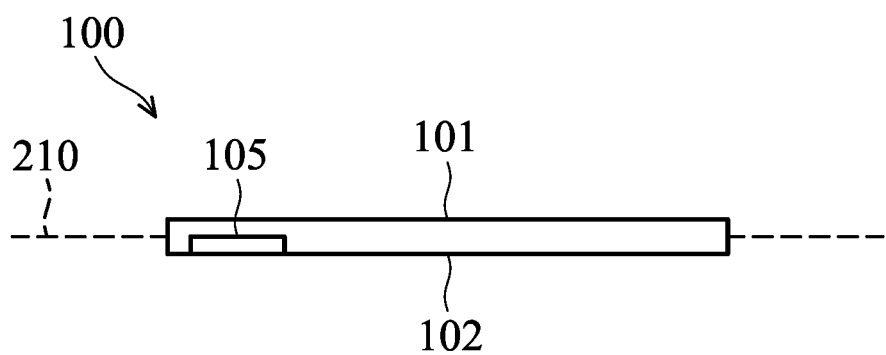
Figure 3A:
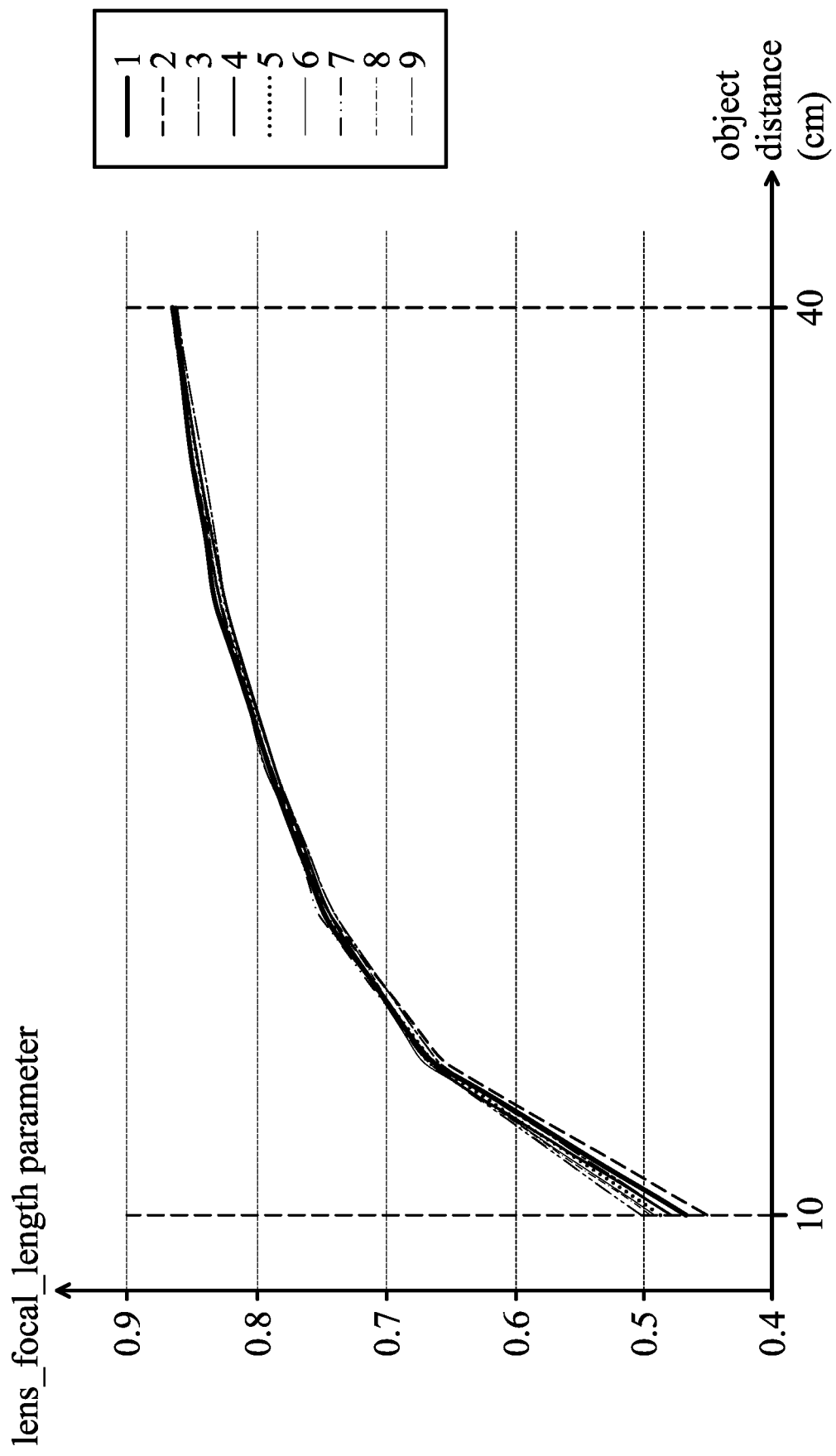
FIG. 3A is a diagram of a relationship curve between the lens-focal-length parameter and the focal length while the electronic device is at the pitch angle of 90 degrees in accordance with an embodiment of the disclosure.
Figure 3B:
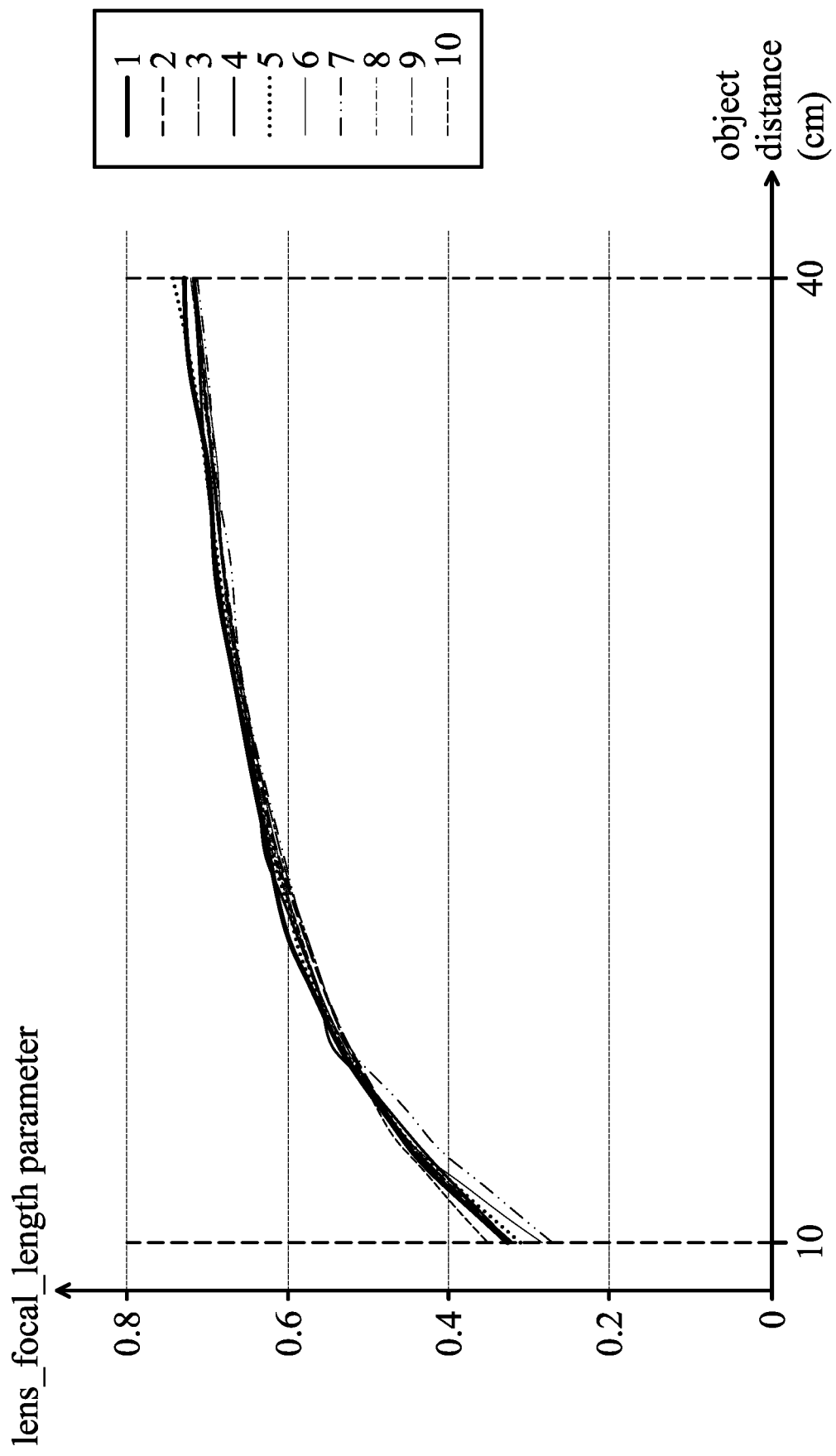
FIG. 3B is a diagram of a relationship curve between the lens-focal-length parameter and the focal length while the electronic device is at the pitch angle of 0 degrees in accordance with an embodiment of the disclosure.

FIGS. 2A-2B are diagrams of the electronic device at different pitch angles in accordance with an embodiment of the disclosure. FIG. 3A is a diagram of a relationship curve between the lens-focal-length parameter and the focal length while the electronic device is at the pitch angle of 90 degrees in accordance with an embodiment of the disclosure. FIG. 3B is a diagram of a relationship curve between the lens-focal-length parameter and the focal length while the electronic device is at the pitch angle of 0 degrees in accordance with an embodiment of the disclosure.

In an embodiment, the electronic device 100, for example, may be an iPhone X, and the specification of the rear camera of the iPhone X (e.g., camera device 105) may include a CMOS image sensor having 12-million pixels, and an aperture f/1.8, focal length 28 mm, unit pixel width 1.22 μm, optical image stabilization (OIS), phase-detection autofocusing. Therefore, the focusing distance of the lens 111 of the electronic device 100, for example, may be in the range between 10 and 40 cm.

In response to the camera device 105 of the electronic device 100 is focusing on a target object, the operating system 141 may report the value of the lens-focal-length parameter lensPosition. It should be noted that if the electronic device 100 is another type of iPhone, such as an iPhone 8, an iPhone 7, an iPhone 7 Plus, etc., because the specification of the camera modules equipped on different models of iPhones are different, the value of the lens-focal-length parameter lensPosition reported by the operating system 141 will also be different in the same focusing distance.

In addition, because of the influence of gravity, the inertial-measurement unit 170 may adjust the focus information reported to the computation unit 120 according to the sensed magnetic force and the spring strength. Accordingly, in the same focusing distance, if the pitch angel of the electronic device 100 is different, the value of the lens-focal-length parameter lensPosition reported by the operating system 141 may also change.

For example, when the electronic device 100 is used to capture pictures, the pitch angle of the electronic device 100 may vary from 0 degrees to 90 degrees. For example, if the front surface 101 of the electronic device 100 is perpendicular to the horizontal line 210, the inertial-measurement unit 170 may detect that the pitch angle of the electronic device 100 is 90 degrees, as depicted in FIG. 2A.

Accordingly, when the pitch angle of the electronic device 100 is set to 90 degrees, the values of the lens-focal-length parameter lensPosition corresponding to different object distances in which the distance between the target object and the lens 111 (e.g., the object distance) in the range between 10 and 40 cm can be measured in advanced, thereby building the relationship curve between the object distance and the lens-focal-length parameter. After repeated measurements, different relationship curves of the pitch angle of the electronic device 100 at 90 degrees can be obtained, as illustrated in FIG. 3A.

If the front surface and the rear surface of the electronic device 100 are completely parallel to the horizontal line 210, the inertial-measurement unit 170 may detect that the pitch angle of the electronic device 100 is at 0 degrees, as illustrated in FIG. 2B.

Accordingly, when the pitch angle of the electronic device 100 is set to 0 degrees, the values of the lens-focal-length parameter lensPosition corresponding to different object distances in which the distance between the target object and the lens 111 (e.g., the object distance) in the range between 10 and 40 cm can be measured in advanced, thereby building the relationship curve between the object distance and the lens-focal-length parameter. After repeated measurements, different relationship curves of the pitch angle of the electronic device 100 at 0 degrees can be obtained, as illustrated in FIG. 3B.

It can be seen from FIGS. 3A and 3B that the relationship between the lens-focal-length parameter lensPosition and the object distance is not a purely proportional or inverse relationship, and may vary with different pitch angles of the electronic device 100. For example, the average value calculated using different curves in FIGS. 3A and 3B can be stored in a lookup table (not shown in FIG. 1) for querying by the computation unit 120.

For example, the terminal parameters Lens10 and Lens40 corresponding to the object distance at 10 cm and 40 cm at the current pitch angle of the electronic device 100 can be calculated using equations (2) and (3) and the pre-measured lens-focal-length $Lens10_{90}$, $Lens10_0$, $Lens40_{90}$, $Lens40_0$:

$$Lens10 = Lens10_{90} + (-Lens10_{90} + Lens10_0) \times \cos(\text{pitch}) \quad (2)$$

$$Lens40 = Lens40_{90} + (-Lens40_{90} + Lens40_0) \times \cos(\text{pitch}) \quad (3)$$

where the lens-focal-length parameters $Lens10_{90}$ and $Lens10_0$ may indicate the value of the lens-focal-length parameter LensPosition reported by the operating system 141 with the object distance of 10 cm and the pitch angles of the electronic device 100 at 90 degrees and 0 degrees, respectively. The lens-focal-length parameters $Lens40_{90}$ and $Lens40_0$ may indicate the value of the lens-focal-length parameter LensPosition reported by the operating system 141 with the object distance of 40 cm and the pitch angles of the electronic device 100 at 90 degrees and 0 degrees, respectively.

It should be noted that the values of the lens-focal-length parameters $Lens10_{90}$, $Lens10_0$, $Lens40_{90}$, $Lens40_0$ may be average values calculated using different curves in FIGS. 3A and 3B. For example, after averaging different curves in FIGS. 3A and 3B, the values of the lens-focal-length parameters $Lens10_{90}$, $Lens10_0$, $Lens40_{90}$, $Lens40_0$ can be obtained as 0.3245100, 0.4823529, 07176470, and 0.8640523, respectively.

Then, the terminal parameters Lens10 and Lens40 obtained from equations (2) and (3) and the measured value of the lens-focal-length parameter lensPosition can be converted into linear parameters L10, L40 and L respectively using equations (4), (5), and (6):

$$L10 = \frac{1}{1 - Lens10 - (k1 - k2 \times \cos(pitch))} \quad (4)$$

$$L40 = \frac{1}{1 - Lens40 - (k1 - k2 \times \cos(pitch))} \quad (5)$$

$$L = \frac{1}{1 - lensPosition - (k1 - k2 \times \cos(pitch))} \quad (6)$$

where parameters k1 and k2 are values measured by the degree of similarity and the error value of the average data curve and the formula fitting curve in FIGS. 3A and 3B, where k1=0.155 and k2=0.13. It should be noted that when the models of the electronic device 100 are different or the specifications of the camera device 105 are different, the values of the parameters k1 and k2 are also adjusted according to practical conditions. For example, the values $Lens10_{90}$, $Lens10_0$, $Lens40_{90}$, $Lens40_0$ and parameters k1 and k2 can be measured in advance, and can be stored in a non-volatile memory (e.g., a read-only memory) of the electronic device 100, but the disclosure is not limited thereto.

After calculating the linear parameters L10, L40 and L, the object distance D between the lens 111 and the target object can be calculated using equation (7) and the calculated linear parameters L10, L40, and L:

$$D = \frac{(L - L10) \times (f_H - f_L)}{L40 - L10} + f_L \quad (7)$$

where $f_L$ denotes the lower threshold (lower focusing distance) of the focusing-distance range of the lens 111, such as 10 cm; $f_H$ denotes the upper threshold (upper focusing distance) of the focusing-distance range of the lens 111, such as 40 cm. Accordingly, the initial value of the object distance D in equation (7) is $f_L$. Briefly, after calculation using equations (2)~(6), the non-linear lens-focal-length parameter lensPosition can be converted into linear parameters L10, L40, and L having linear relationships. Accordingly, the computation unit 120 may calculate the object distance D using the linear parameters L10, L40, and L, the upper focusing distance, and the lower focusing distance.

In response to the object distance D between the lens 111 and the target object being calculated, the computation unit 120 may calculate the actual width W1 and actual height H1 of the whole object image captured by the image sensor 113. If the object image captured by the image sensor 113 is in a portrait mode and the object image has a pixel width PW1 and pixel height PH1 where PW1:PH1=9:16, the actual height H1 can be converted to the actual width W1*(16/9) using the same ratio between pixel width PW1 and pixel height PH1. If the ratio between the pixel width PW1 and pixel height PH1 of the object image is 3:4 (i.e., PW1:PH1=3:4), the actual height H1 can be converted to the actual width W1*(4/3).

It should be noted that the width/height ratio of the object image captured by the image sensor 113 is not limited to the aforementioned ratios, and can be determined according to the specification and orientation (e.g., portrait mode or landscape mode) of the image sensor 113 equipped in the electronic device 100.

Figure 4A:
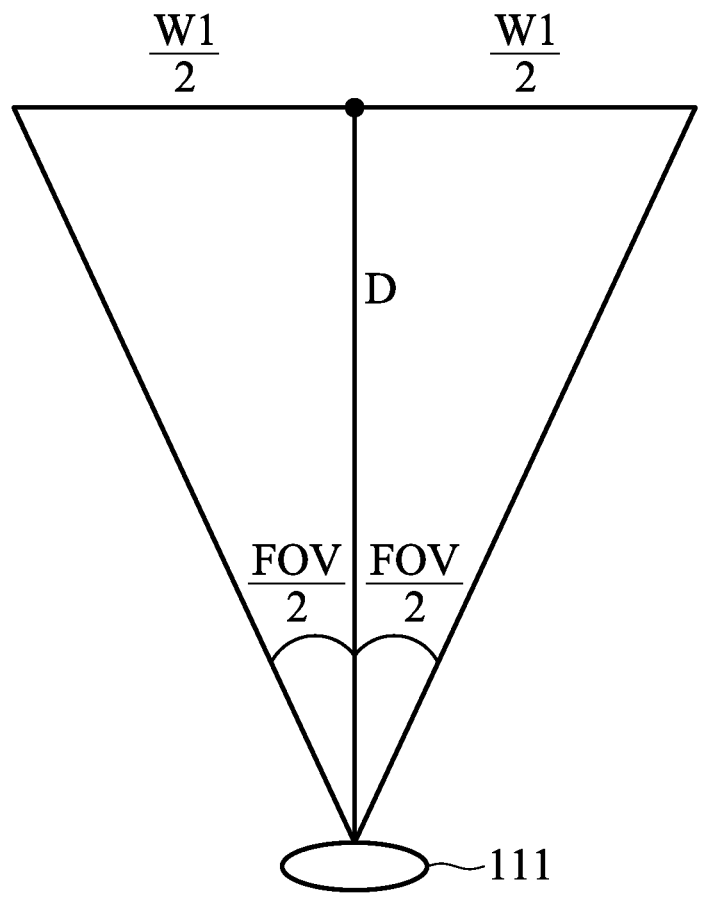
FIG. 4A is a diagram of the relationship between the FOV of the lens, object image, and object distance in accordance with an embodiment of the disclosure.
Figure 4B:
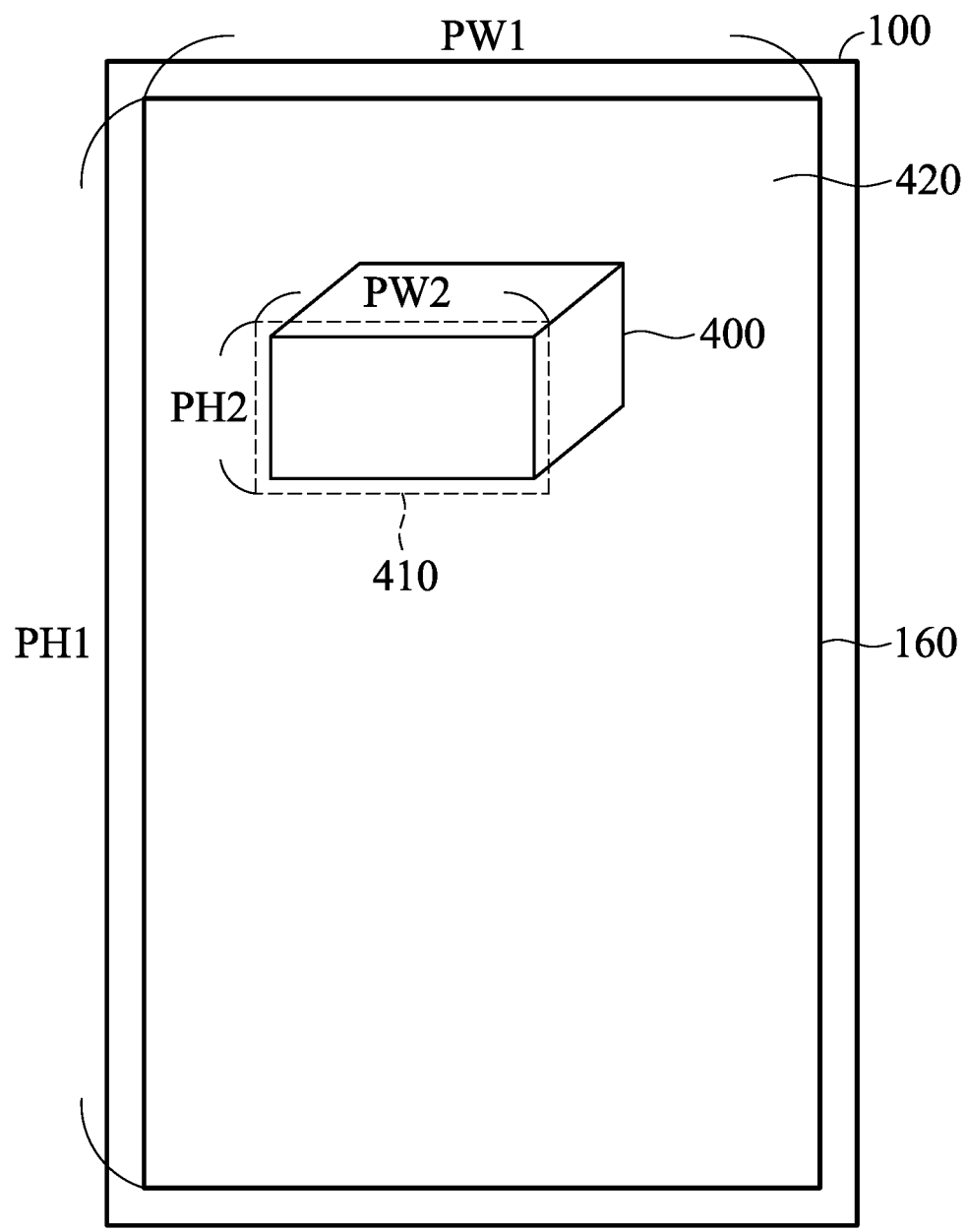
FIG. 4B is a diagram of the user interface of the image-distance-measuring program in accordance with an embodiment of the disclosure.

FIG. 4A is a diagram of the relationship between the FOV of the lens, object image, and object distance in accordance with an embodiment of the disclosure. FIG. 4B is a diagram of the user interface of the image-distance-measuring program in accordance with an embodiment of the disclosure.

Specifically, the relationship between the FOV of the lens 111, the actual width W of the object image, and the object distance D can be calculated using the proportional relationship shown in FIG. 4A, and the relationship can be expressed using equation (8):

$$\tan\left(\frac{FOV}{2}\right) = \frac{\frac{W1}{2}}{D} = \frac{W1}{2D} \quad (8)$$

where the FOV of the lens 111 is known, which can be referred to in the specification provided by the manufacturer of the electronic device 100, and the FOVs of the camera devices in the electronic devices 100 of different product numbers may differ. The object distance D can be calculated sequentially using equations (2)~(7) in the aforementioned embodiments. Accordingly, the computation unit 120 may calculate the actual width W1 corresponding to the object image, where $$W1 = 2D \times \tan\left(\frac{FOV}{2}\right).$$

Since the actual width W1 and actual height H1 corresponding to the object image is in a predetermined ratio R (e.g., 9:16 or 3:4), the computation unit 120 may divide the calculated actual width W1 with the predetermined ratio R to obtain the actual height H1. Alternatively, if the computation unit 120 may use the proportional relationship in FIG. 4 to calculate the actual height H1, the computation unit 120 may multiply the calculated actual height H1 with the predetermined ratio to obtain the actual width W1. It should be noted that the actual width W1 and the actual height H1 corresponding to the object image can be expressed by centimeters, but the disclosure is not limited thereto.

In addition, if the actual area A of the whole object image captured by the image sensor 113 is to be calculated, the computation unit 120 may multiply the actual width W1 with the actual height H1 to obtain the actual area A1 of the object image, such as A1=H1*W1.

Referring to FIG. 4B, in an embodiment, the user may activate the image-distance-measuring program 142 on the electronic device 100, and set the camera device 105 of the electronic device 100 to focus on the target object 400 to capture an object image 420. The computation unit 120 may display the object image 420 on the display panel 160. Meanwhile, the computation unit 120 may obtain the value of the lens-focal-length parameter lensPosition from the operating system 141, and obtain the pitch of the electronic device 100 from the inertial-measurement unit 170.

Then, the computation unit 120 may calculate the actual width W1 (or actual height H1) corresponding to the object image using equations (2)~(7), and calculate the actual height H1 (or actual width W1) according to the predetermined ratio between the actual width W1 and actual height H1.

In addition, the user may control the electronic device 100 to display a rectangular frame 410 on the display panel 160 via a touch signal performed on the display panel 160, and adjust the size of the rectangular frame 410 to match the size of the target object or a region of interest (ROI). For example, the rectangular frame 410 has a pixel width PW2 and pixel height PH2, and the computation unit 120 may calculate the ratio $R_W$ between the pixel width PW2 of the rectangular frame 410 and the pixel width PW1 of the object image, and calculate the ratio $R_H$ between the pixel height PH2 of the rectangular frame 410 and pixel height PH1 of the object image. Then, the computation unit 120 may multiply the calculated actual width W1 and actual height H1 corresponding to the object image with the ratios $R_W$ and $R_H$ to obtain the actual width W2 and actual height H2 of the rectangular frame 410, respectively. The computation unit 120 may further label the values of the actual width W2 and actual height H2 at corresponding positions of the rectangular frame 410 or at a specific position on the display panel 160.

It should be noted that if the electronic device 100 of different models is used or the ANDROID operating system is performed by the electronic device 100, similar processes can be performed, such as equations (2)~(6). For example, the lens-focal-length parameter reported by the operating system 141 can be used to derive corresponding terminal parameters and linear parameters that are used to calculate the object distance D between the target object and the camera device 105. Then, the computation unit 120 may calculate the actual width W1 and actual H1 corresponding to the object image according to the triangular relationships shown in FIG. 4 and equation (8).

Figure 5A:
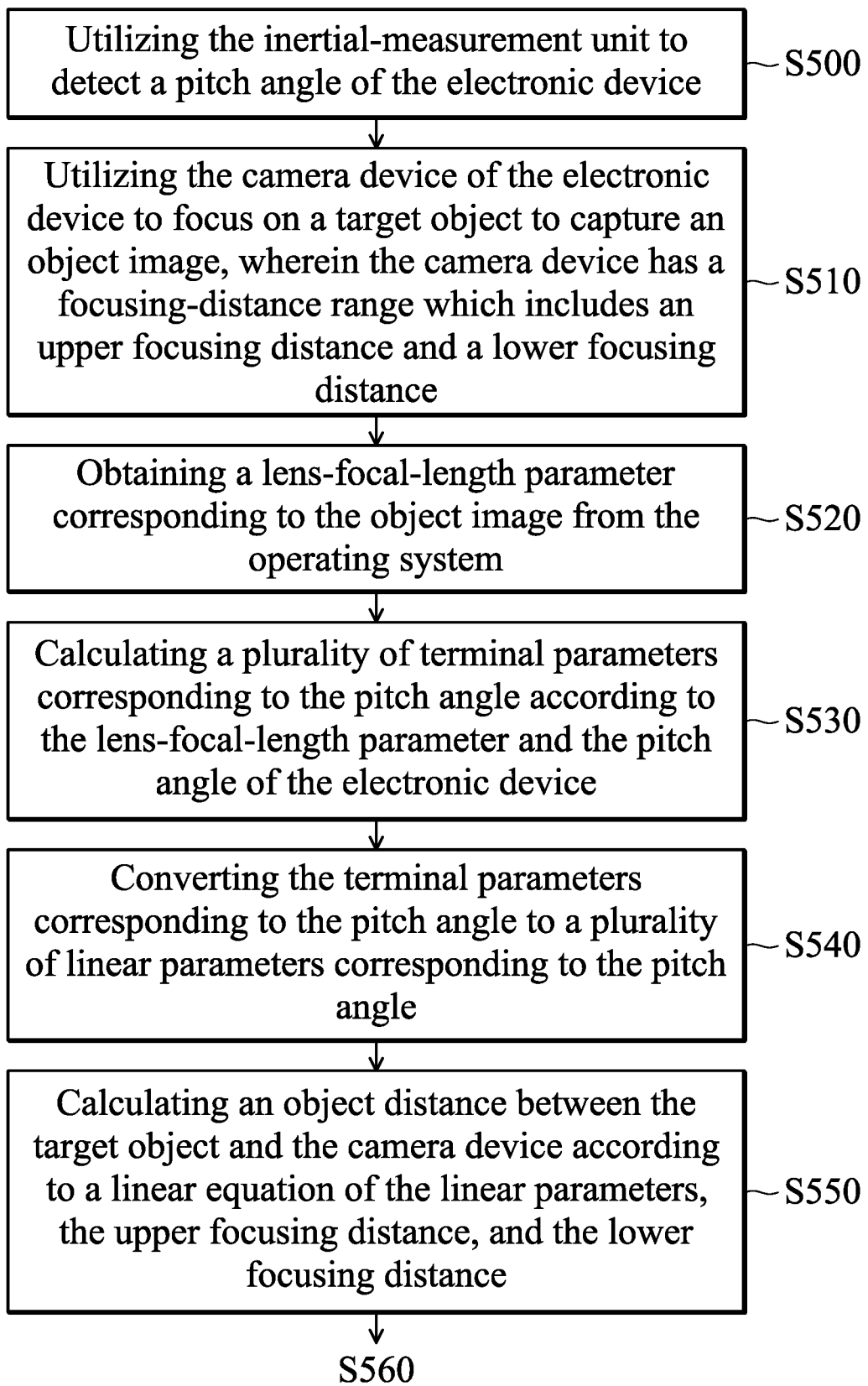
FIGS. 5A-5B are portions of a flow chart of a method for measuring an object distance using an image in accordance with an embodiment of the disclosure.
Figure 5B:
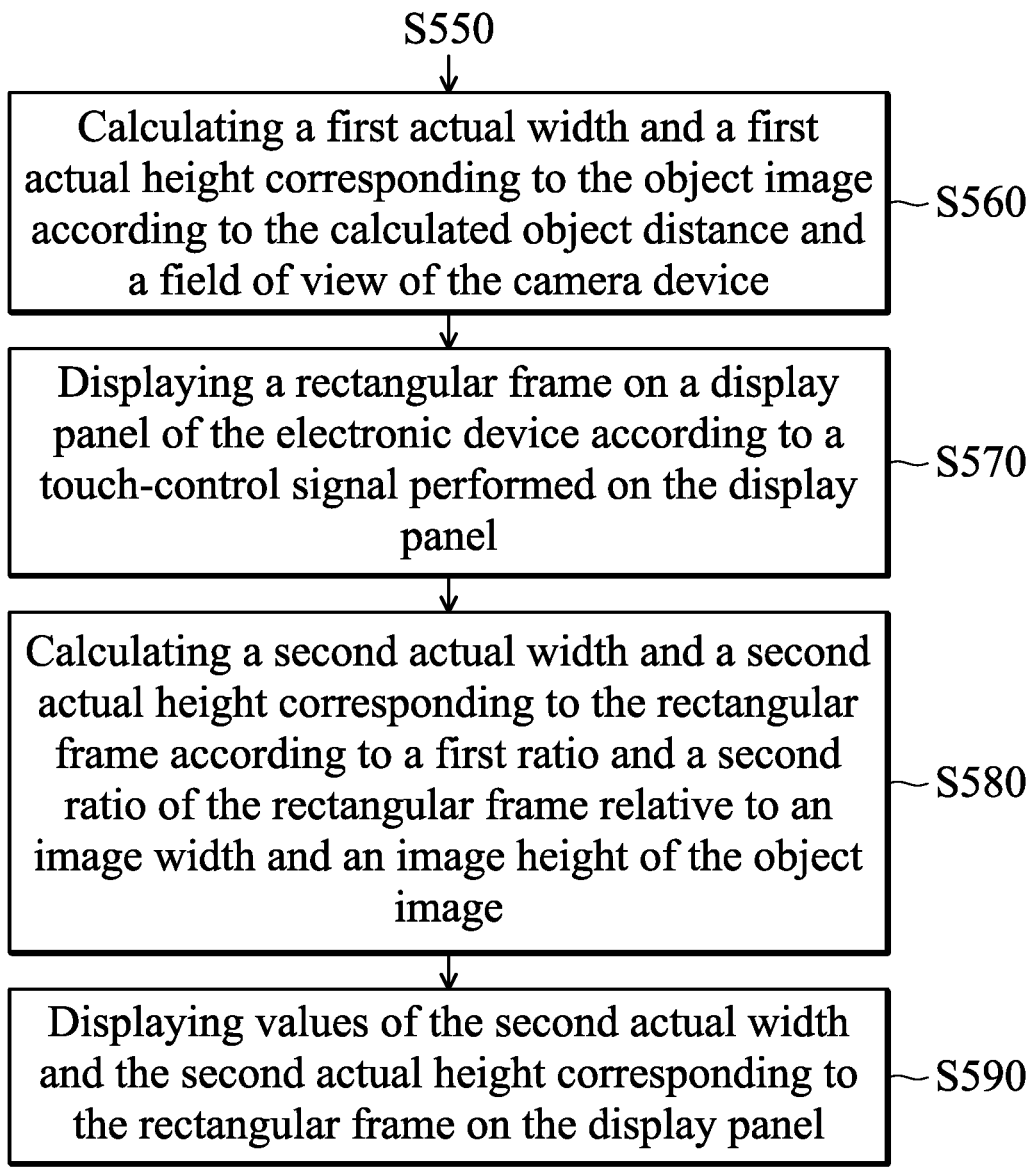

FIGS. 5A-5B are portions of a flow chart of a method for measuring an object distance using an image in accordance with an embodiment of the disclosure.

In step S500, the inertial-measurement unit 170 is utilized to detect a pitch angle of the electronic device 100. For example, when the electronic device 100 is utilized to capture pictures, the pitch angle of the electronic device 100 may vary from 0 degrees to 90 degrees, and the inertial-measurement unit 170 may detect the variation of the pitch angle of the electronic device 100.

In step S510, the camera device 105 of the electronic device 100 is utilized to focus on a target object to capture an object image, wherein the camera device 105 has a focusing-distance range which includes an upper focusing distance and a lower focusing distance. For example, the upper focusing distance and lower focusing distance can be calculated according to the specification of the lens 111 of the camera device 105. If the electronic device 100 is an iPhone X, the focusing-distance range of the lens 111 is between 10 and 40 cm. That is, the upper focusing distance is 40 cm, and the lower focusing distance is 10 cm.

In step S520, a lens-focal-length parameter corresponding to the object image is obtained from the operating system 141 performed by the electronic device 100. For example, if the electronic device 100 is a model of the iPhone 4S or above and the operating system 141 is a version of iOS 8 or above, the lens-focal-length parameter reported by the operating system 141, for example, may be "lensPosition". The lens-focal-length parameter lensPosition may be a value between 0 and 1, where the value 0 may indicate the closet distance that the lens 111 can focus on, and the value 1 may indicate the farthest distance that the lens 111 can focus on, but the farthest distance does not represent infinity. It should be noted that the lens-focal-length parameter lensPosition does not directly indicate the focal length value of the lens 111, but a value that has been converted by the operating system 141 and is not equal to the value of a constant divided by the focal length. In addition, the value of the lens-focal-length parameter lensPosition reported by the operating system 141 also changes according to the pitch angle of the electronic device 100.

In step S530, a plurality of terminal parameters corresponding to the pitch angle of the electronic device 100 are calculated according to the lens-focal-length parameter and the pitch angle of the electronic device 100. For example, the computation unit 120 may obtain a first lens-focal-length parameter (e.g., $Lens10_0$) and a second lens-focal-length parameter (e.g., $Lens10_{90}$) corresponding to the pitch angle of 0 degrees and 90 degrees at the lower focusing distance (e.g., 10 cm) of the electronic device from the operating system 141, and obtain a third lens-focal-length parameter (e.g., $Lens40_0$) and a fourth lens-focal-length parameter (e.g., $Lens40_{90}$) corresponding to the pitch angle of 0 degrees and 90 degrees at the upper focusing distance (e.g., 40 cm) of the electronic device from the operating system 141. The plurality of terminal parameters, for example, may be include a first terminal parameter and a second terminal parameter, and the computation unit 120 may calculate the first terminal parameter (e.g., Lens10) according to the first lens-focal-length parameter, the second lens-focal-length parameter, and the pitch angle (i.e., using equation (2)), and calculate the second terminal parameter (e.g., Lens40) according to the third lens-focal-length parameter, the fourth lens-focal-length parameter, and the pitch angle (i.e., using equation (3)).

In step S540, the terminal parameters corresponding to the pitch angle are converted to a plurality of linear parameters corresponding to the pitch angle. For example, the linear parameter may include a first linear parameter (e.g., L10) corresponding to the first terminal parameter, a second linear parameter (e.g., L40) corresponding to the second terminal parameter, and a third linear parameter (e.g., L). The computation unit 120 may calculate the first linear parameter according to the first terminal parameter and the pitch angle (e.g., using equation (4)), calculate the second linear parameter according to the second terminal parameter and the pitch angle (e.g., using equation (5)), and calculate the third linear parameter according to the lens-focal-length parameter lensPosition and the pitch angle (e.g., using equation (6)).

In step S550, an object distance between the target object and the camera device 105 is calculated according to a linear equation of the linear parameters, and the upper focusing distance, and lower focusing distance. For example, after the first linear parameter (e.g., L10), the second linear parameter (e.g., L40), and the third linear parameter (e.g., L) have been calculated, the computation unit 120 may calculate the object distance between the target object and the camera device 105 according to the linear equation of the first, second, third linear parameters and the upper and lower focusing distances (e.g., equation (7))

In step S560, a first actual width and a first actual height corresponding to the object image are calculated according to the object distance and the field of view (FOV) of the camera device 105. Since the computation unit 120 has calculated the object distance and the FOV of the lens 111 is known, the computation may calculate the first actual width according to the proportional relationship between the FOV of the lens 111, the first actual width corresponding to the object image, and the object distance (e.g., can be referred to in FIG. 4A and equation (8)). Because the first actual width and the first actual height corresponding to the object image has a predetermined ratio R (e.g., 9:16 or 3:4), the computation unit 120 may divide the calculated first actual width by the predetermined ratio R to obtain the first actual height.

In step S570, a rectangular frame is displayed on the display panel 160 according to a touch-control signal performed on the display panel 160. For example, the user may control the electronic device 100 to display a rectangular frame 410 on the display panel 160 via a touch signal performed on the display panel 160, and adjust the size of the rectangular frame 410 to match the size of the target object or a region of interest (ROI).

In step S580, a second actual width and a second actual height corresponding to the rectangular frame are calculated according to a first ratio and a second ratio of the rectangular frame relative to the image width and image height of the object image. For example, the ratio (i.e., the first ratio) of the image width of the rectangular frame to the image width of the object image is also equivalent to the ratio of the corresponding second actual width of the rectangular box to the corresponding first actual width of the object image. Accordingly, after calculating the corresponding first actual width of the object image, the first actual width of the object image can be multiplied by the first ratio to obtain the corresponding second actual width of the rectangular frame. The corresponding second actual height of the rectangular frame can also be calculated in a similar manner.

In step S590, values of the second actual width and the second actual height of the rectangular frame are displayed on the display panel 160. For example, the computation unit 120 may label the values of the second actual width and the second actual height corresponding to the rectangular frame at corresponding positions of the rectangular frame, or a specific location on the display panel 160.

In view of the above, an electronic device and a method for measuring an object distance using an image are disclosed. The electronic device and the method are capable of calculating the object distance between the target object and the camera device using the FOV of the lens, the lens-focal-length parameter reported by the operating system, and the pitch angle of the electronic device. In comparison with prior art, the electronic device and the method provided in the disclosure are capable of obtaining the distance information of the target object without using the augmented reality technology to pre-establish the spatial distance information, and do not need to be equipped with an additional ranging device to measure the distance information of the target object. Therefore, the electronic device and the method provided in the disclosure can quickly and effectively calculate the distance information of the target object.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
an inertial-measurement unit, configured to detect a pitch angle of the electronic device;
a camera device, configured to focus on a target object to capture an object image, wherein the camera device has a focusing-distance range, the focusing-distance range comprising an upper focusing distance and a lower focusing distance;
a storage device, configured to store an operating system and an image-distance-measuring program; and
a processor, configured to perform the image-distance-measuring program to perform the steps of:
obtaining a lens-focal-length parameter corresponding to the object image from the operating system performed by the processor;
calculating a plurality of terminal parameters corresponding to the pitch angle according to the lens-focal-length parameter and the pitch angle of the electronic device;
converting the terminal parameters corresponding to the pitch angle to a plurality of linear parameters corresponding to the pitch angle; and
calculating an object distance between the target object and the camera device according to a linear equation of the linear parameters, the upper focusing distance, and the lower focusing distance.

2. The electronic device as claimed in claim 1, wherein during the step of calculating a plurality of terminal parameters corresponding to the pitch angle according to the lens-focal-length parameter and the pitch angle of the electronic device, the processor further obtains, from the operating system, a first lens-focal-length parameter and a second lens-focal-length parameter corresponding to the lower focusing distance with the pitch angle of 0 degrees and 90 degrees, and obtains, from the operating system, a third lens-focal-length parameter and a fourth lens-focal-length parameter corresponding to the upper focusing distance with the pitch angle of 0 degrees and 90 degrees,
wherein the terminal parameters comprise a first terminal parameter corresponding to the lower focusing distance, and a second terminal parameter corresponding to the upper focusing distance, and the processor further calculates the first terminal parameter according to the first lens-focal-length parameter, the second lens-focal-length parameter, and the pitch angle, and calculates the second terminal parameter according to the third lens-focal-length parameter, the fourth lens-focal-length parameter, and the pitch angle.

3. The electronic device as claimed in claim 2, wherein the linear parameters comprise a first linear parameter corresponding to the first terminal parameter, a second linear parameter corresponding to the second terminal parameter, and a third linear parameter, and the processor calculates the first linear parameter according to the first terminal parameter and the pitch angle, calculates the second linear parameter according to the second terminal parameter and the pitch angle, and calculates the third linear parameter according to the lens-focal-length parameter and the pitch angle.

4. The electronic device as claimed in claim 3, wherein the linear equation is expressed as:

$$D = \frac{(L - L10) \times (f_H - f_L)}{L40 - L10} + f_L$$

where D denotes the object distance; L10 denotes the first linear parameter; L40 denotes the second linear parameter; L denotes the third linear parameter; $f_H$ denotes the upper focusing distance; and $f_L$ denotes the lower focusing distance.

5. The electronic device as claimed in claim 1, wherein in response to the processor calculating the object distance, the processor further calculates a first actual width and a first actual height corresponding to the object image according to the calculated object distance and a field of view of the camera device.

6. The electronic device as claimed in claim 5, wherein the processor further displays a rectangular frame on a display panel of the electronic device according to a touch-control signal performed on the display panel, and calculates a second actual width and a second actual height corresponding to the rectangular frame according to a first ratio and a second ratio of the rectangular frame relative to an image width and an image height of the object image, wherein the processor further displays values of the second actual width and the second actual height corresponding to the rectangular frame on the display panel.

7. A method for measuring a distance using an image, for use in an electronic device, wherein the electronic device comprises an inertial-measurement unit and a camera device, the method comprising:

utilizing the inertial-measurement unit to detect a pitch angle of the electronic device;

utilizing the camera device to focus on a target object to shoot an object image, wherein the camera device has a focusing-distance range which comprises an upper focusing distance and a lower focusing distance;

obtaining a lens-focal-length parameter corresponding to the object image from an operating system performed by the electronic device;

calculating a plurality of terminal parameters corresponding to the pitch angle according to the lens-focal-length parameter and the pitch angle of the electronic device;

converting the terminal parameters corresponding to the pitch angle to a plurality of linear parameters corresponding to the pitch angle; and calculating an object distance between the target object and the camera device according to a linear equation of the linear parameters, the upper focusing distance, and the lower focusing distance.

8. The method as claimed in claim 7, wherein the terminal parameters comprise a first terminal parameter corresponding to the lower focusing distance, and a second terminal parameter corresponding to the upper focusing distance, and the step of calculating a plurality of terminal parameters corresponding to the pitch angle according to the lens-focal-length parameter and the pitch angle of the electronic device comprises:

obtaining, from the operating system, a first lens-focal-length parameter and a second lens-focal-length parameter corresponding to the lower focusing distance with the pitch angle of 0 degrees and 90 degree;

obtaining, from the operating system, a third lens-focal-length parameter and a fourth lens-focal-length parameter corresponding to the upper focusing distance with the pitch angle of 0 degrees and 90 degree;

calculating the first terminal parameter according to the first lens-focal-length parameter, the second lens-focal-length parameter, and the pitch angle; and calculating the second terminal parameter according to the third lens-focal-length parameter, the fourth lens-focal-length parameter, and the pitch angle.

9. The method as claimed in claim 8, wherein the linear parameters comprise a first linear parameter corresponding to the first terminal parameter, a second linear parameter corresponding to the second terminal parameter, and a third linear parameter, and the step of calculating an object distance between the target object and the camera device according to a linear equation of the linear parameters, the upper focusing distance, and the lower focusing distance comprises:

calculating the first linear parameter according to the first terminal parameter and the pitch angle;

calculating the second linear parameter according to the second terminal parameter and the pitch angle; and calculating the third linear parameter according to the lens-focal-length parameter and the pitch angle.

10. The method as claimed in claim 9, wherein the linear equation is expressed as:

$$D = \frac{(L - L10) \times (f_H - f_L)}{L40 - L10} + f_L$$

where D denotes the object distance; L10 denotes the first linear parameter; L40 denotes the second linear parameter; L denotes the third linear parameter; $f_H$ denotes the upper focusing distance; and $f_L$ denotes the lower focusing distance.

11. The method as claimed in claim 7, further comprising:

in response to the object distance being calculated, calculating a first actual width and a first actual height corresponding to the object image according to the calculated object distance and a field of view of the camera device.

12. The method as claimed in claim 11, further comprising:

displaying a rectangular frame on a display panel of the electronic device according to a touch-control signal performed on the display panel;

calculating a second actual width and a second actual height corresponding to the rectangular frame according to a first ratio and a second ratio of the rectangular frame relative to an image width and an image height of the object image; and displaying values of the second actual width and the second actual height corresponding to the rectangular frame on the display panel.

* * * * *